United States Patent
Nelson

[19]

[11] Patent Number: 6,061,718
[45] Date of Patent: May 9, 2000

[54] ELECTRONIC MAIL DELIVERY SYSTEM IN WIRED OR WIRELESS COMMUNICATIONS SYSTEM

[75] Inventor: Michael P. Nelson, Denison, Tex.

[73] Assignee: Ericsson Inc., Research Triangle Park, N.C.

[21] Appl. No.: 08/899,772

[22] Filed: Jul. 23, 1997

[51] Int. Cl.⁷ .............................. G06F 13/38; G06F 15/17
[52] U.S. Cl. .................. 709/206; 709/203; 709/207; 709/219; 709/238; 709/245; 379/52; 379/88.13; 379/88.14; 379/88.22; 704/260; 705/26; 455/414; 455/466; 455/550
[58] Field of Search .................... 709/200, 206, 709/207; 379/93.01; 455/88

[56] References Cited

U.S. PATENT DOCUMENTS

| | | | |
|---|---|---|---|
| 4,837,798 | 6/1989 | Cohen et al. | 379/88 |
| 5,186,629 | 2/1993 | Rohen | 434/114 |
| 5,608,786 | 3/1997 | Gordon | 379/100 |
| 5,689,550 | 11/1997 | Garson et al. | 379/89 |
| 5,732,216 | 3/1998 | Logan et al. | 709/203 |
| 5,737,395 | 4/1998 | Irribarren | 379/88 |
| 5,870,454 | 2/1999 | Dahlen | 379/88.14 |
| 5,870,549 | 2/1999 | Bobo, II | 709/206 |
| 5,915,001 | 6/1999 | Uppaluru | 379/88.22 |
| 5,920,824 | 7/1999 | Beatty et al. | 455/550 |
| 5,938,725 | 8/1999 | Hara | 709/206 |
| 5,940,806 | 8/1999 | Danial | 705/26 |
| 5,943,395 | 8/1999 | Hansen | 379/52 |
| 5,943,398 | 8/1999 | Klien et al. | 379/88.13 |
| 5,943,401 | 8/1999 | Risner et al. | 379/88.22 |
| 5,944,786 | 8/1999 | Quinn | 709/206 |
| 5,946,629 | 8/1999 | Sawyer et al. | 455/466 |
| 5,950,123 | 8/1999 | Schwelb et al. | 455/414 |
| 5,958,006 | 9/1999 | Eggleston et al. | 709/219 |
| 5,978,837 | 11/1999 | Foladare et al. | 709/207 |
| 6,021,433 | 2/2000 | Payne et al. | 709/219 |

FOREIGN PATENT DOCUMENTS

| | | |
|---|---|---|
| 0 710 042 | 5/1996 | European Pat. Off. . |
| WO 97/29579 | 8/1997 | WIPO . |

OTHER PUBLICATIONS

Bretschneider, F., "It is a Very Aggressive Evolution", *COMTEC*, pp. 14–15 (May 27, 1997).

"Portable, Speech–Activated, Electronic Mail System", *IBM Technical Disclosure Bulletin*, vol. 38, NO. 7, pp. 537–538 (Jul. 1, 1995).

Shivji, et al., "Voice Mail Internetworking Using X.400", *Message Handling Systems and Application Layer Communication Protocols*, pp. 113–122 (Jan. 1, 1991).

*Primary Examiner*—Frank J. Asta
*Assistant Examiner*—Bunjob Jaroenchonwanit
*Attorney, Agent, or Firm*—Robert A. Samra

[57] ABSTRACT

An electronic mail (E-mail) delivery system for delivering E-mail messages to and from a subscriber station in a wireless or wired communications system. The E-mail delivery system converts E-mail messages sent to the subscriber station from text to speech for delivery to the subscriber station. Furthermore, the E-mail delivery system converts E-mail messages sent by the subscriber station from speech to text for delivery to a remote destination.

15 Claims, 2 Drawing Sheets

ELECTRONIC MAIL DELIVERY SYSTEM IN WIRED OR WIRELESS COMMUNICATIONS SYSTEM

BACKGROUND OF THE INVENTION

1. Technical Field

The present invention relates to the delivery of electronic mail (E-mail) messages in a wired or wireless communications system and, more specifically, to the delivery of E-mail messages of unrestricted length to a fixed or mobile subscriber who can learn the contents of those messages without being distracted from performing other activities.

2. Related Prior Art

The prior art includes cellular radio systems which have been operating in the United States and Europe for the last two decades. Cellular telephone service operates much like the fixed, wireline telephone service in homes and offices, except that radio frequencies rather than telephone wires are used to connect telephone calls to and from the mobile subscribers. Each mobile subscriber is assigned a private (10 digit) directory telephone number and is usually billed based on the amount of "airtime" he or she spends talking on the cellular telephone each month. Many of the service features available to landline telephone users (e.g., call waiting, call forwarding, three-way calling, etc.) are also generally available to mobile subscribers. In each market area, mobile subscribers usually have the freedom to subscribe to service from at least two systems. The local system from which service is subscribed is called the "home" system. When travelling outside the home system, a mobile subscriber may be able to obtain service in a distant system if there is a "roaming" agreement between the operators of the home and "visited" systems.

The architecture for a typical cellular radio system is shown in FIG. 1. A geographical area (e.g., a metropolitan area) is divided into several smaller, contiguous radio coverage areas, called "cells", such as cells C1–C10. The cells C1–C10 are served by a corresponding group of fixed radio stations, called "base stations", B1–B10, each of which includes a plurality of radio frequency (RF) channel units (transceivers) that operate on a subset of the RF channels assigned to the system, as well known in the art. The RF channels allocated to any given cell may be reallocated to a distant cell in accordance with a frequency reuse plan as is also well known in the art. In each cell, at least one RF channel, called the "control" or "paging/access" channel, is used to carry control or supervisory messages. The other RF channels are used to carry voice conversations and thus are called the "voice" or "speech" channels. The cellular telephone users (mobile subscribers) in the cells C1–C10 are provided with portable (hand-held), transportable (hand-carried) or mobile (car-mounted) telephone units, collectively referred to as "mobile stations", such as mobile stations M1–M5, each of which communicates with a nearby base station. Each of the mobile stations M1–M5 includes a microphone, a loudspeaker, a controller (microprocessor) and a transceiver, as well known in the art. The transceiver in each mobile station may tune to any of the RF channels specified in the system (whereas each of the transceivers in the base stations B1–B10 usually operates on only one of the different RF channels used in the corresponding cell).

With continuing reference to FIG. 1, the base stations B1–B10 are connected to and controlled by a mobile telephone switching office (MTSO) 20. The MTSO 20, in turn, is connected to a central office (not specifically shown in FIG. 1) in the landline (wireline) public switched telephone network (PSTN) 22, or to a similar facility such as an integrated services digital network (ISDN). The MTSO 20 switches calls between wireline and mobile subscribers, controls signalling and assignment of voice channels to the mobile stations M1–M5, compiles billing statistics, stores subscriber service profiles, and provides for the operation, maintenance and testing of the system. An important function of the MTSO 20 is to perform a "handoff" of a call from one base station to another base station B1–B10 as one of the mobile stations M1–M5 moves between cells C1–C10. The MTSO 20 monitors the quality of the voice channel in the old cell and the availability of voice channels in the new cell. When the channel quality falls below a predetermined level (e.g, as the user travels away from the old base station towards the perimeter of the old cell), the MTSO 20 selects an available voice channel in the new cell and then orders the old base station to send to the mobile station on the current voice channel in the old cell a handoff message which informs the mobile station to tune to the selected voice channel in the new cell.

The original cellular radio systems, as described generally above, used analog transmission methods, specifically frequency modulation (FM), and duplex (two-way) RF channels in accordance with the Advanced Mobile Phone Service (AMPS) standard. This original AMPS (analog) architecture formed the basis for an industry standard sponsored by the Electronics Industries Association (EIA) and the Telecommunications Industry Association (TIA), and known as EIA/TIA-553. In the middle to late 1980s, however, the cellular industry both in the United States and in other parts of the world began migrating from analog to digital technology, motivated in large part by the need to address the steady growth in the subscriber population and the increasing demand on system capacity. The industry thus developed a number of air interface standards which use digital voice encoding (analog-to-digital conversion and voice compression) and advanced digital radio techniques, such as time division multiple access (TDMA) or code division multiple access (CDMA), to multiply the number of voice circuits (conversations) per RF channel (i.e., to increase capacity).

In Europe and Japan, the GSM and PDC standards, respectively, both of which use TDMA, have been widely implemented. In the United States, the EIA/TIA has developed a number of digital standards, including IS-54 (TDMA) and IS-95 (CDMA), both of which are "dual mode" standards in that they support the use of the original AMPS analog voice channels (AVCHs) and analog control channel (ACCH), in addition to newer digital traffic channels (DTCHs) defined within the existing AMPS framework, so as to ease the transition from analog to digital and to allow the continued use of existing analog mobile stations. The dual-mode IS-54 standard, in particular, has become known as the digital AMPS (D-AMPS) standard. More recently, the EIA/TIA has developed a new specification for D-AMPS, which includes a digital control channel (DCCH) suitable for supporting data services and extended mobile station battery life. This new specification, which builds on the IS-54B standard (the current revision of IS-54), is known as IS-136.

FIG. 2 shows the forward RF channel (base station to mobile station) as generally specified in the IS-136 standard. Referring to the upper part of FIG. 2, each RF channel comprises a series of repeating time slots which are grouped into 40 ms frames carrying from three to six DTCHs depending on the source rate of the speech coder used for each DTCH. According to IS-136, the speech coder for any DTCH can operate at either "full-rate" or "half-rate". A full-rate DTCH occupies two slots per frame (channel "A", "B" or "C" in FIG. 2) while a half-rate DTCH occupies one slot per frame (not shown for the sake of simplicity). At call set-up or handoff, a dual-mode mobile station will be assigned preferably to a DTCH (full-rate or half-rate) and, if none is available, it can be assigned to an AVCH. An analog-only mobile station, however, can be assigned only to an AVCH.

In IS-136, the DCCH is defined similarly to the DTCH (i.e., the DCCH and DTCH use the same TDMA frame format and slot size, and can share the same RF channel). Thus, a half-rate DCCH would occupy one slot while a full-rate DCCH would occupy two slots out of the six slots in each 40 ms frame. The DCCH slots are mapped to different logical channels which are organized into a series of superframes. The lower part of FIG. 2 shows the superframe structure of a full-rate DCCH (in this example, the DCCH is defined over channel "A" in the TDMA frame). A superframe is defined in IS-136 as the collection of 32 consecutive time slots (640 ms) for a full-rate DCCH (16 slots for a half-rate DCCH). The logical channels specified in IS-136 include a broadcast control channel (BCCH) for carrying system-related information which is broadcast to all mobile stations, and a short message service, paging and access response channel (SPACH) for carrying information which is sent to specific mobile stations.

As shown in FIG. 2, the BCCH is divided into logical subchannels each of which is assigned an integer number of DCCH slots. The BCCH subchannels include a fast BCCH (F-BCCH), an extended BCCH (E-BCCH) and a point-to-multipoint short message service BCCH (S-BCCH). The F-BCCH is used to broadcast DCCH structure parameters and other information required for accessing the system (the first slot in a superframe is always assigned to the F-BCCH). The E-BCCH, which may span several superframes, is used to broadcast information that is not as time-critical (for the operation of the mobile stations) as the information in the F-BCCH. The S-BCCH is used for the broadcast short message service (SMS), which can deliver alphanumeric messages of common interest to all mobile stations (e.g., traffic reports).

The SPACH is also divided into logical subchannels each of which is assigned a given number of time slots on a fully dynamic basis (and, thus, these subchannels are not explicitly shown in FIG. 2). The SPACH subchannels include a point-to-point short message service channel (SMSCH), a paging channel (PCH) and an access response channel (ARCH). The SMSCH is used for carrying alphanumeric messages of interest to a specific mobile station (e.g., stock quotations). The PCH is used for carrying paging messages to different mobile stations. The ARCH is used for responding to access requests from one of the mobile stations (e.g., by delivering a channel assignment message to that mobile station).

Among the uses slated for the SMSCH specified in IS-136 is the delivery of electronic mail (E-mail) messages to the mobile subscribers. However, there are two practical problems with the delivery of E-mail messages via the SMSCH (or the equivalent DCCH subchannel specified in other digital standards). First, messages sent on the SMSCH are displayed on a small liquid crystal display (LCD) screen (or a similar display screen) in the mobile station. This means that the user of the mobile station may be distracted from his other activities (e.g., driving, working, etc.) while reading and/or scrolling through a typical E-mail message which exceeds the display capacity of the LCD screen. In certain instances (e.g., if the user is operating a vehicle, heavy machinery or other equipment), such distractions may present a danger to the safety of the user and/or other persons.

Second, SMSCH messages are inherently limited in length to a certain number of characters (bytes). For example, according to IS-136, SMSCH messages must not be longer than 250 characters. Taking into consideration the signalling overhead requirements, the effective length of SMSCH messages is reduced even further to approximately 239 characters. Although it may be possible to use the EBCCH (or a similar DCCH subchannel) for sending E-mail messages of greater length than 239 characters, that would result in the division of the text of the E-mail message over two or more superframes at arbitrary points in the text. Such an arbitrary division (i.e., "chopping") would be likely to further complicate the task of reading the E-mail message at the mobile station, and to exacerbate the risk of the user becoming distracted while reading the message.

Therefore, there is a need for a new E-mail delivery system which does not restrict the length of an E-mail message to a mobile subscriber, and which will allow the mobile subscriber to learn the contents of the E-mail message without being distracted from performing other activities.

SUMMARY OF THE INVENTION

The E-mail delivery system of the present invention may be used instead of, or in addition to, the prior art system of delivering E-mail messages to a mobile station via the SMSCH on the DCCH. Furthermore, the E-mail delivery system of the present invention may be used for delivering E-mail to messages to a standard telephone station (wired or cordless) in the PSTN. Thus, for purposes of the present invention, the term "subscriber station" refers to a mobile station in a wireless communications system and/or a telephone station in the PSTN.

In one aspect, the present invention provides an electronic mail (E-mail) delivery system for delivering E-mail messages to a subscriber station. The E-mail delivery system comprises means for receiving an E-mail message addressed to the subscriber station; means for storing the received E-mail message for retrieval by the subscriber station; means for sending to the subscriber station a signal indicating that the stored E-mail message is awaiting retrieval by the subscriber station; means for retrieving the waiting E-mail message for delivery to the subscriber station in response to a signal from the subscriber station requesting that the waiting E-mail message be read to the subscriber station; means for converting the retrieved E-mail message into a speech message; and means for sending the speech message to the subscriber station. In one application of this system the subscriber station may comprise a mobile station and the message waiting signal may be sent on an analog or digital control channel, while the speech message may be sent on an analog or a digital voice channel.

The E-mail delivery system of the present invention may also provide for the delivery of E-mail messages from the subscriber station to a remote destination (e.g., a personal computer connected to the Internet). In this aspect, the subscriber station may comprise means for inputting into the subscriber station an E-mail message as a speech message, and means for sending the input speech message from the subscriber station to the system. Furthermore, the system may comprise means for converting the input speech message from the subscriber station into a text message, and means for sending the text message from the system to the remote destination.

In another aspect, the present invention provides a method for delivering an E-mail message from a remote source to a subscriber station. The method comprises the steps of receiving the E-mail message from the remote source; storing the received E-mail message for retrieval by the subscriber station; sending from the system to the subscriber station a signal indicating that the E-mail message is awaiting retrieval by the subscriber station; sending from the subscriber station to the system a signal requesting that the waiting E-mail message be read to the subscriber station; retrieving the waiting E-mail message for delivery by the system to the subscriber station; converting the retrieved E-mail message into a speech message; and sending the speech message from the system to the subscriber station. In one application of this method, the subscriber station may comprise a mobile station and the message waiting signal may be sent on an analog or digital control channel, while the speech message may be sent on an analog or a digital voice channel in the system.

In yet another aspect, the present invention provides a method for delivering an E-mail message from a subscriber station to a remote destination (e.g., a personal computer connected to the Internet). This method comprises the steps of inputting the E-mail message into the subscriber station as a speech message; sending the speech message from the subscriber station to the system; converting the speech message into a text message; and sending the text message from the system to the remote destination. In one application of this method, the subscriber station may comprise a mobile station and the speech message may be sent over an analog or a digital voice channel in the system.

BRIEF DESCRIPTION OF THE DRAWINGS

The present invention will be better understood and its numerous objects and advantages will become apparent to those skilled in the art by reference to the following drawings in which.

DETAILED DESCRIPTION OF THE INVENTION

The E-mail delivery system of the present invention will be illustrated with reference to FIG. 3. A person desiring to send an E-mail message to a mobile subscriber having a mobile station 30 uses a personal computer (PC) 40 to compose the E-mail message and to address it to the mobile subscriber in a conventional manner. The E-mail message is routed through the world wide web (WWW) 42 or some other part of the Internet to an E-mail server 44 which stores messages for this mobile subscriber. The E-mail server 44 may be operated, for example, by a cellular service, personal communications services (PCS) or an internet service provider from which the mobile subscriber has obtained E-mail service. The E-mail server 44 stores the incoming E-mail message and notifies a MTSO 46 in the system which is currently serving the mobile station 30. Alternatively, the MTSO 46 (or a processor connected to the MFSO 46) could periodically check (poll) the E-mail server 44 for any messages stored for (and not previously accessed by) the mobile station 30. As will be readily appreciated by persons of ordinary skill in the art, the MTSO 46 may be in the home system of the mobile station 30 or in a visited system to which the mobile station 30 has roamed.

Figure 1:
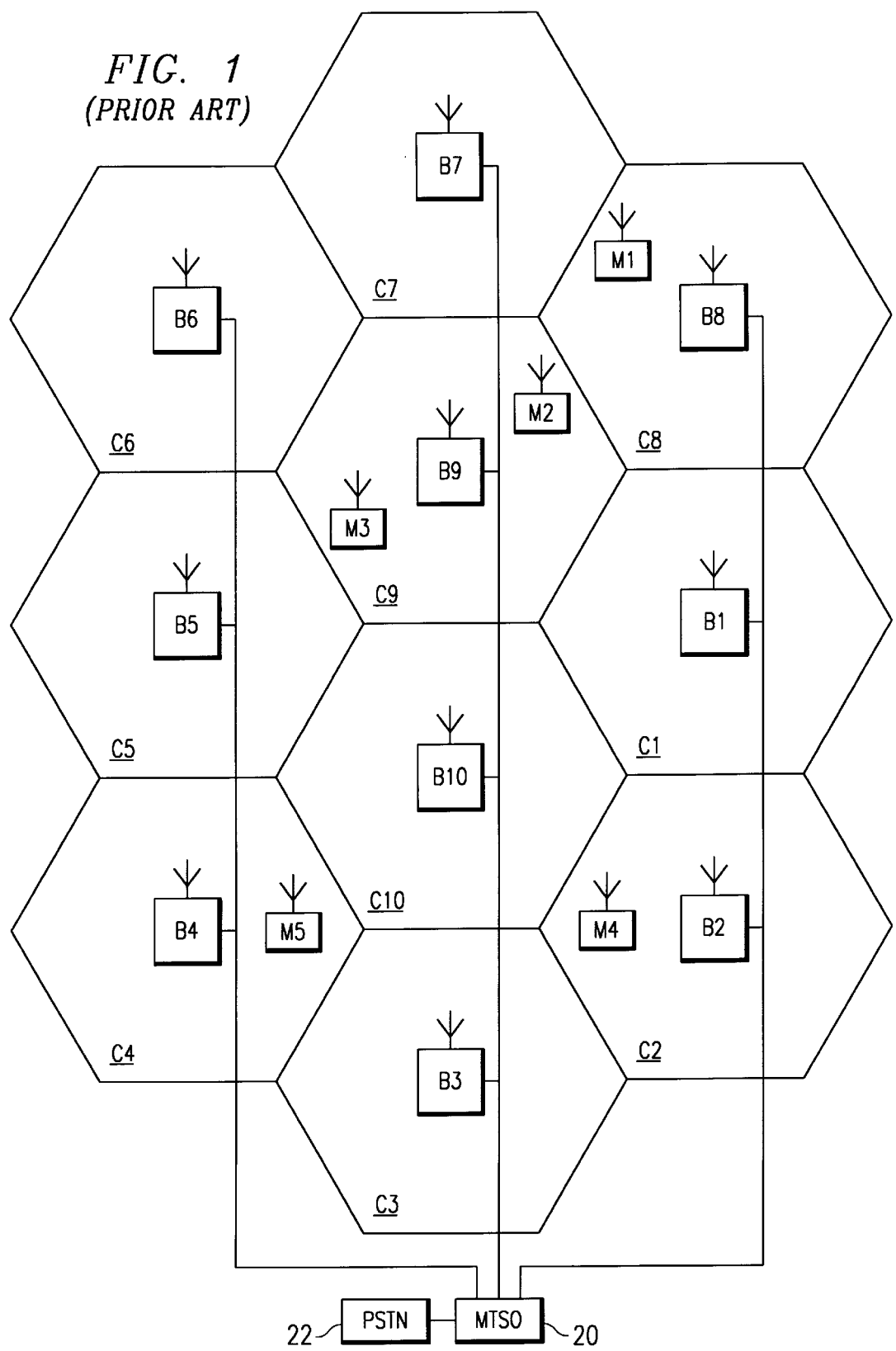
FIG. 1 is a block diagram of an exemplary radio communications system including a plurality of base stations and a plurality of mobile stations.
Figure 2:
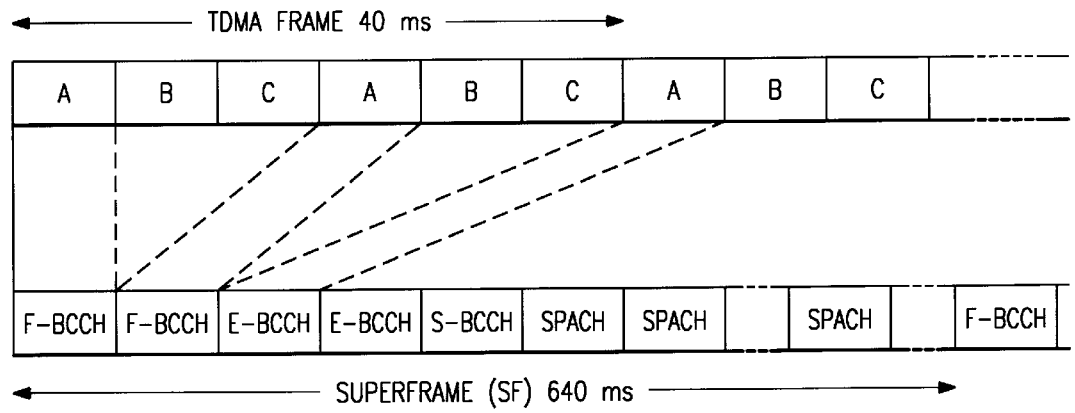
FIG. 2 shows the structure for a superframe of a digital control channel (DCCH) as specified in IS-136, a known industry standard, the DCCH superframe including a service, paging and access response channel (SPACH) which may be used for transmitting E-mail messages from a base station to a mobile station in FIG. 1.
Figure 3:
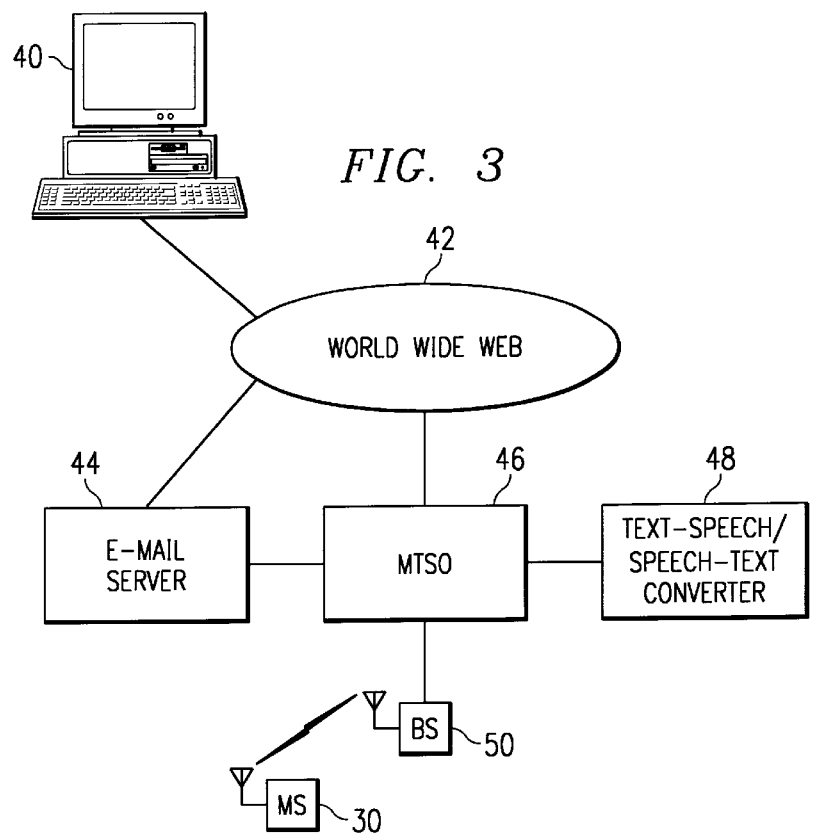
FIG. 3 is a block diagram of an E-mail delivery system constructed in accordance with the present invention.

With continuing reference to FIG. 3, whenever the MTSO 46 detects that a new message has been received by the E-mail server 44 for the mobile station 30, the MTSO 46 will order a base station (BS) 50 that is currently serving the mobile station 30 to send a message waiting signal over the DCCH (or ACCH) to the mobile station 30. This message waiting signal could be sent, for example, over the PCH in FIG. 2. Upon receiving this signal, the mobile station 30 displays a message waiting indication to the mobile subscriber. At this point, the mobile subscriber has the option of either retrieving the message over the SMSCH for display in the mobile station in a conventional manner or invoking the E-mail delivery system of the present invention. The mobile subscriber can select between these two options, for example, by pressing a certain key or entering a predefined code in the mobile station 30. As one example, the mobile subscriber could enter *100 to retrieve the text of the message via the SMSCH for display in the mobile station 30. Alternatively, the mobile subscriber could enter *101 to have the message delivered via the system of the present invention.

If, for instance, the mobile subscriber is driving in heavy city traffic and does not wish to look at the display in the mobile station 30 for an extended period of time in order to read the waiting E-mail message, he could enter *101 (or some other predefined code) to have the E-mail message, in essence, read to him or her instead. This action causes the mobile station 30 to send a signal through the BS 50 requesting the MTSO 46 to read the E-mail message. Upon receiving this request, the MTSO 46 retrieves the E-mail message and forwards it to a text-to-speech converter 48, which converts the text of the E-mail message into a corresponding speech message. Alternatively, the MTSO 46 may request the E-mail server 44 to forward the E-mail message directly to the text-to-speech converter 48 for conversion into a speech message. The MTSO 46 also assigns the mobile station 30 a DTCH or AVCH, as appropriate, for delivering the speech message. Once the mobile station 30 has switched from the DCCH (or ACCH) to the DTCH (or AVCH), the speech message is sent to the mobile station 30 and output via the loudspeaker to the mobile subscriber, as with any normal telephone conversation.

It will be readily appreciated that the E-mail delivery system of the present invention as illustrated above also can be used "in reverse". That is, the mobile subscriber can dictate an E-mail message into the microphone in the mobile station 30 for transmission over a DTCH (or AVCH) to the MTSO 46 via the BS 50. The MTSO 46 then will use the speech-to-text converter 48 to convert the spoken E-mail message into E-mail text, which is now forwarded through the WWW 42 to the appropriate destination (e.g., the PC 40). It will be noted that in the case of the mobile subscriber articulating an E-mail message for transmission, it may be necessary to "train" the speech-to-text converter 48 to recognize the dialect, accent, slang, etc., used by the mobile subscriber, as with any conventional voice recognition system.

As one example of an implementation for delivering E-mail messages from the mobile station, the mobile subscriber could enter the code *111 on the keypad of the mobile station to signal the system (via the ACCH or DCCH, for example) that he desires to dictate an E-mail message for delivery to a remote destination. The first time this code is entered by the mobile subscriber, the system will prompt the mobile subscriber to enunciate (say) each of the letters in the alphabet, each of the digits (0–9) and certain commonly used characters (e.g., "@", ".", "!", etc.) any number of times as required by the voice recognition algorithm. The system may then prompt the mobile subscriber to set up a directory of frequently used E-mail addresses. Thus, for example, the system will prompt the mobile subscriber to pronounce the name of each addressee and then to spell his or her E-mail address. The names and addresses in this directory will be stored by the system.

Once initial setup is completed (and each subsequent time *111 is pressed), the system will prompt the mobile subscriber to compose a new E-mail message. For this purpose, the system will first prompt the mobile subscriber to enter the destination address by pronouncing a name from the previously stored directory or by spelling the destination address letter-by-letter (if, for example, this address is not in the directory). Alternatively, the mobile subscriber could be given the option to enter the destination address using the keypad on the mobile station. Once the destination address has been input, the system will prompt the mobile subscriber to dictate the contents of the E-mail message (including a subject heading if desired). After the mobile subscriber has finished his or her dictation, the E-mail message can be delivered by the system to its intended destination in the manner described above.

It will be noted by persons of ordinary skill in the art that the particular transmission format between the MS 30 and the BS 50 is not material to the present invention (whether for delivering E-mail messages to or from the MS 30). Thus, the present invention is equally applicable in the context of wireless systems which may implement an air interface standard other than IS-136 (e.g., GSM or PDC) for transmissions between the MS 30 and the BS 50.

It will be further noted that the teachings of the present invention are not limited to wireless communications systems, but are also applicable to wired communications systems. Returning to FIG. 3, it will be seen that the techniques of the present invention can be readily applied in a wired environment if, for example, a local central office is substituted for the MTSO 46, and a standard household telephone station (wired or cordless) is substituted for the MS 30, the telephone station being connected to the local central office in a local loop as well known in the art.

While certain forms or embodiments of the present invention have been illustrated and described above, those skilled in the art will readily recognize that many modifications and variations may be made to, or substituted in, those forms or embodiments without substantially departing from the spirit and scope of the present invention. Accordingly, the forms or embodiments of the present invention disclosed herein are exemplary and are not intended as a limitation on the scope of the present invention as defined in the following claims.

What is claimed is:

1. A method for delivering an electronic mail (E-mail) message from a remote source to a subscriber station in a wireless communications system using a plurality of radio frequency (RF) channels, including control and voice RF channels, the method comprising the steps of:

receiving said E-mail message from said remote source;

storing said received E-mail message for retrieval by said subscriber station;

sending from said system to said subscriber station over a control channel a signal indicating that said stored E-mail message is awaiting retrieval by said subscriber station;

sending from said subscriber station to said system over said control channel a signal requesting that said waiting E-mail message be read to said subscriber station;

retrieving said waiting E-mail message for delivery by said system to said subscriber station;

converting said retrieved E-mail message into a speech message;

assigning a voice channel to said subscriber station: and sending said speech message from said system to said subscriber station over said assigned voice channel.

2. The method of claim 1 wherein said subscriber station is a mobile station and said message waiting signal is sent on an analog or a digital control channel in said system.

3. The method of claim 2 wherein said speech message is sent on an analog or digital voice channel in said system.

4. The method of claim 1 wherein said E-mail message is stored at an E-mail server which can be accessed by said system.

5. The method of claim 1 wherein said remote source is a personal computer connected to the Internet.

6. The method of claim 1 further comprising the steps of:

inputting an E-mail message into said subscriber station as a speech message;

sending said input speech message from said subscriber station to said system over a voice channel;

converting said input speech message into a text message at said system; and sending said text message from said system to a remote destination.

7. The method of claim 6 wherein said subscriber station comprises a mobile station and said input speech message is sent over an analog or a digital voice channel in said system.

8. The method of claim 6 wherein said remote destination is a personal computer connected to the Internet.

9. An electronic mail (E-mail) delivery system for delivering E-mail messages to a subscriber station operating on a plurality of radio frequency (RF) channels, including control and voice RF channels, the system comprising:

means for receiving an E-mail message addressed to said subscriber station;

means for storing said received E-mail message for retrieval by said subscriber station;

means for sending to said subscriber station over a control channel a signal indicating that said stored E-mail message is awaiting retrieval by said subscriber station;

means for retrieving said waiting E-mail message for delivery to said subscriber station in response to a signal received from said subscriber station over said control channel requesting that said waiting E-mail message be read to said subscriber station;

means for converting said retrieved E-mail message into a speech message;

means for assigning a voice channel to said subscriber station; and means for sending said speech message to said subscriber station over said assigned voice channel.

10. The system of claim 9 wherein said subscriber station comprises a mobile station and said message waiting signal is sent on an analog or a digital control channel.

11. The system of claim 10 wherein said speech message is sent on an analog or a digital voice channel.

12. The system of claim 9 wherein said storing means comprises an E-mail server.

13. The system of claim 9 wherein said subscriber station comprises means for inputting into said subscriber station an E-mail message as a speech message, and means for sending said input speech message over a voice channel from said subscriber station to said system; and wherein said system comprises means for converting said input speech message from said subscriber station into a text message, and means for sending said text message from said system to a remote destination.

14. The system of claim 13 wherein said subscriber station comprises a mobile station and said input speech message is sent over an analog or a digital voice channel.

15. The system of claim 13 wherein said remote destination is a personal computer connected to the Internet.

* * * * *